Jan. 14, 1930.  C. T. CABRERA  1,743,525
FILTERING MEDIUM
Filed June 1, 1928
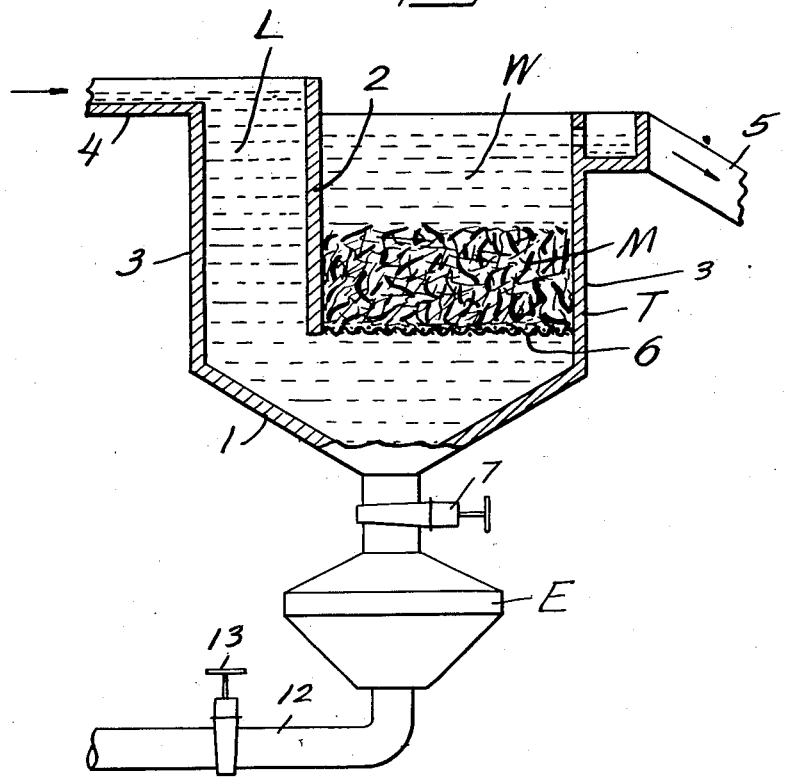
INVENTOR
Charles T. Cabrera
BY
Pennie, Davis, Marvin & Edmonds.
HIS ATTORNEYS Patented Jan. 14, 1930

1,743,525

UNITED STATES PATENT OFFICE

CHARLES T. CABRERA, OF NEW YORK, N. Y., ASSIGNOR TO ELECTRO DIALYZER CORPORATION, OF NEW YORK, N. Y., A CORPORATION OF NEW YORK

FILTERING MEDIUM

Application filed June 1, 1928. Serial No. 282,217.

This invention relates to a filtering medium for use in the clarification of solid laden liquids.

This application is a continuation in part of my copending application Serial No. 233,497, filed November 15, 1927.

Many solid laden liquids, such as sewage and the waste liquids from pulp and textile mills or from tanning or other industrial plants must be subjected to various forms of treatment for the removal of soluble and insoluble solids therefrom. It is often desirable or essential, particularly in the treatment of sewage, that very large quantities of the solid laden liquid be continuously filtered, and it is further desirable that substantially all of the soluble or collodial solids as well as insoluble solids be removed during the filtering process. The clarification treatments ordinarily employed include filtration through mesh screens, filter cloths, felted fabrics or beds of sand and earth. These treatments have proven unsatisfactory for various reasons.

If mesh screens or fabric filtering mediums are employed, the soluble and partially soluble solids are not removed to a sufficient extent. For example, certain fine organic matter, which is suspended in many liquids in a colloidal state, is not effectively separated from the liquid vehicle by the use of filtering mediums of this type. Further, due to the fixed nature of the interstices therein, mesh screens or fabric filters are quickly clogged by the solids strained from the liquid being treated, and the flow of the liquid is thereby undesirably reduced and eventually completely arrested.

Filter beds composed of densely packed sand, earth or other granular material have proven more effective than fabric filters in the treatment of certain liquids, but filter beds of this nature are open to serious objection in that the liquid flow therethrough is extremely slow. Thus the space occupied by a sand or earth filter bed of sufficient capacity to continuously handle a considerable volume of liquid is usually prohibitive, particularly in congested communities. Further, filter beds of this nature clog quickly and are difficult to clean. Even though the granular material employed is very closely packed, certain soluble or colloidal materials are not wholly removed from the filtered liquid, and when sewage or similar liquids are filtered the filtrate must be subjected to further treatment.

With the above and other considerations in mind, it is proposed in accordance with the present invention to provide an improved filtering medium for use in separating solids from liquids. More particularly, it is proposed to provide a filtering medium which effects an extremely high degree of separation between the liquid vehicle and the soluble and collodial solids as well as the insoluble ore sedimentary solids therein. A further object of the invention resides in the provision of a filtering medium which is not easily clogged by the filtered solids and which is sufficiently permeable to be capable of continuously treating large volumes of liquid. The filtering medium of the present invention provides a means for increasing the effective screening or filtering area of filtering apparatus of standard type without increasing the dimensions of the devices or the filtering elements thereof.

Various other objects, advantages and characteristic features of the present invention will become apparent and will be pointed out as the description thereof progresses.

In accordance with the present invention, the above and other objects and advantages are obtained by employing a filtering medium composed of fragmentized metal in the form of intimately associated and finely stranded metallic filaments. More particularly, the filtering medium of the present invention comprises a plurality of intermixed strands of two potentially and physically dissimilar metals.

In describing the invention in detail, reference will be made to the accompanying drawings, in which;

Figure 1 is a sectional side view of a filtering device embodying the filtering medium of the present invention; and Fig. 2 is an enlarged view of a mass of filtering material prepared in accordance with the present invention.

The filtering medium of the present invention may be employed in connection with a great variety of filtering, straining, pressing or dying devices. The filtering device as illustrated in the drawings thus merely comprises a typical example of one form of apparatus in which the improved filtering medium may be employed, and it should be understood that the invention is in no way limited to the particular apparatus shown.

The filtering device comprises generally a tank or vat T, preferably of rectangular shape, and having a downwardly tapered bottom wall 1. A vertical partition 2 is fixed across the tank T near one end thereof, extending between the walls 3 and spaced from the bottom wall 1 as shown. A partition 2 divides the tank into an inlet passage L and a filter well or passageway W. A suitable inlet trough or open conduit 4 is fixed to the upper edge of the tank T at one end thereof in communication with the upper end of the inlet passage L. An outlet trough or duct 5 is provided at the upper edge of the filter passageway W as shown to conduct the filtrate from the tank T.

The filtering medium M is supported within the filter well W by any suitable means, and in the embodiment shown, a screen 6 of comparatively large mesh is suitably secured across the bottom of the well W and the filtering material M is supported thereon. If desired, the filtering material M may be compressed to and maintained at any desired degree of density by any suitable means.

The lower apex of the bottom wall 1 of the tank T is connected through a cut off valve 7 to an ejector E of suitable construction. The ejector is provided with an outlet pipe 12 having a cut off valve 13 therein. The particular construction of the ejector used forms no part of the present invention and therefore will not be described herein, it being sufficient to understand that this device operates, with the aid of compressed air or otherwise, to carry the accumulated sludge or sediment away from the bottom of the tank T.

The liquid flow path through the above described filtering device will be readily apparent. The solid laden liquid enters the inlet passage L through the inlet trough 4, flows downwardly beneath the partition 2 and upwardly through the filter well W where the solids are filtered therefrom by the filtering medium M, as hereinafter described. The filtrate rises above the material M and flows out of the tank T through the outlet trough 5. The solids collect below the filtering material M and periodically fall to the tapered bottom of the tank and are collected within and periodically ejected by the ejector E.

Referring now more particularly to the filtering medium of the present invention, as generally explained above, this material comprises the intermixed strands, shavings or filaments of two dissimilar metals, intimately compacted and having the general appearance and composition of materials known as metallic wools. In forming the stranded filtering medium M, it is preferred to employ two metals having different normal potentials, so that strong galvanic couples are produced therebetween during the filtering process. The liquids treated are, in most cases, conductive electrolytes, and the potential differences between the dissimilar metals therefore cause the flow of electric currents through or differences of electrical potential in the solid laden liquid. It has been found that the filtering action, particularly in regard to the separation of colloidal matter and certain soluble solids from the liquid, is materially improved by the use of metals having different normal potentials in the form described, and this marked improvement in the filtering action is believed to arise in part from the current flow or the differences in electrical potential produced by the electrolytic action described. In practice, such potentially dissimilar metals such as lead and zinc, lead and copper, lead and aluminum or zinc and copper, may be employed, but any other metals or alloys having dissimilar normal potentials with respect to hydrogen or any other potential reference may be used.

The metals employed in forming the filtering medium of the present invention are preferably dissimilar in their physical properties as well as in their galvanic or potential relation. Thus one of the metals employed is preferably of a comparatively light and resilient nature, while the other is somewhat heavier and more ductile. The two metals are intimately intermixed and compacted, and when combined in this manner, the heavier metal strands partially fill the interstices between the strands of resilient metal, thus holding the mass together and giving it body. The lighter resilient metal prevents the settling or matting of the filtering medium into an unduly compact and impermeable mass and further provides a degree of resilient yieldability to the liquid passing therethrough, thus causing changes in the size and location of the interstices in the mass and tending to deflect and arrest the movement, within the liquid, of solid or colloidal particles which would be carried through an inert filtering medium. By the use of the filtering medium comprising a mixed wool of soft and heavy metal with light and resilient metal, a filter bed is produced which has the combined advantages of sufficiently fine interstices to give a highly efficient filtering action, and ample flexible and resilient responsiveness to the impinging liquid to prevent matting and clogging.

In Fig. 2 of the drawings, the heavy ductile metal, such as lead, is indicated at 8, while the lighter and resilient metal is indicated at 9.

The filtering medium of the present invention may be employed in a wide variety of filtering, clarifying and drying devices. Thus filter beds formed of this medium may be used in gravity or hydraulic presses, in filter presses of the direct action or plunger type, or in any other form of apparatus for separating solids from solid laden liquids. The mixed metallic wool may be employed in unconfined form, or may be enclosed within suitable permeable containers, and may be compressed to any degree of density desired. The enclosed masses of filtering material may be employed to form removable beds or barriers for use in various types of filtering apparatus.

The permeability of the filtering medium may be suitably fixed at any desired value by the degree to which the metallic wool is compressed or compacted. In certain cases, where a comparatively fine mesh filter is desired, the wool is compressed by suitable presses or by hammer blows to reduce the interstices therethrough to the required size.

Due to its metallic structure, the filtering medium of the present invention is capable of withstanding extremely high temperatures and hydraulic pressures without danger of rupture or disintegration. For this reason, the material is particularly desirable for use in high pressure or plunger type filter presses, or where the liquids must be treated while hot. When corrosive liquids are to be treated, the metals comprising the filtering medium are so chosen as to be capable of withstanding the action of the particular liquids to be passed therethrough.

Due to the irregular character of the compacted metallic strands and the interstices therebetween, the filtering medium of the present invention presents innumerable obstacles to the liquid flow and the liquid is thereby diverted through a plurality of tortuous channels. Because of this structural irregularity, the screening and filtering effect obtained in the filtering medium of the present invention is appreciably greater than that obtainable in a bed of granular, woven or fibrous material of equal depth. The irregular formation described further maintains contact between the metallic strands and the liquid over a considerably greater portion of the liquid flow than would be possible if mesh screens or other known forms of metallic mediums were employed, thus permitting the effective galvanic or electrolytic action of the dissimilar metals on the liquid, as explained above.

It should be understood that the filtering medium of the present invention is not limited to the particular metals mentioned herein, nor to use in the particular filtering apparatus shown or described, and that the scope of the invention covers all such variations from the described structure as fall within the limits of the appended claims.

I claim:

1. A filtering medium comprising a mass of intimately associated and intermixed strands of physically dissimilar metals having different normal potentials.

2. A filtering medium comprising a mass of finely divided and intimately associated strands of metals having different normal potentials and different degrees of resiliency.

3. A filtering medium comprising a mass of finely divided and intimately associated strands of a light resilient metal having a given normal potential and of a heavy and less resilient metal having a different normal potential.

4. A filtering medium comprising a mass of finely divided and intimately associated strands of two metals comprising zinc and a heavier and less resilient metal having a lower normal potential than zinc.

5. A filtering medium comprising a mass of finely divided and intimately associated strands of zinc and lead.

6. Filtering material comprising a mass of metallic wool comprising a mass of stranded intermixed shavings of two dissimilar metals.

In testimony whereof I affix my signature.

CHARLES T. CABRERA.